United States Patent
Hapsari et al.

(10) Patent No.: US 8,224,287 B2
(45) Date of Patent: Jul. 17, 2012

(54) BROADCAST INFORMATION NOTIFICATION METHOD AND NETWORK NODE

(75) Inventors: Wuri Andarmawanti Hapsari, Yokosuka (JP); Minami Ishii, Yokohama (JP); Alf Zugenmaier, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/810,724

(22) PCT Filed: Apr. 8, 2009

(86) PCT No.: PCT/JP2009/057215
§ 371 (c)(1),
(2), (4) Date: Apr. 28, 2011

(87) PCT Pub. No.: WO2009/125796
PCT Pub. Date: Oct. 15, 2009

(65) Prior Publication Data
US 2011/0195738 A1    Aug. 11, 2011

(30) Foreign Application Priority Data
Apr. 8, 2008  (JP) .................................. 2008-100878

(51) Int. Cl.
*H04M 11/04* (2006.01)
(52) U.S. Cl. .................................. 455/404.1; 455/412.1
(58) Field of Classification Search ............... 455/550.1, 455/458, 521, 404, 404.1, 404.2, 410
See application file for complete search history.

(56) References Cited

U.S. PATENT DOCUMENTS
2004/0229605 A1 * 11/2004 Hwang et al. .............. 455/426.1
2009/0186595 A1    7/2009 Son et al.

FOREIGN PATENT DOCUMENTS
EP            2 040 393 A1    3/2009
WO      2007/148701 A1    12/2007

OTHER PUBLICATIONS

3GPP TS 22.168 V8.0.0, Mar. 2008, 3rd Generation Partnership Project; Technical Specification Group Services and System Aspects; Earthquake and Tsunami Warning System (ETWS) requirements; Stage 1 (Release 8), 12 pages.
3GPP TSG RAN WG2 Meeting #61bis, R2-081916, "Reply LS to SA2 regarding ETWS Security," Mar. 31, 2008, 2 pages.
International Search Report issued in PCT/JP2009/057215, mailed on Jul. 14, 2009, with translation, 3 pages.
Written Opinion issued in PCT/JP2009/057215, mailed on Jul. 14, 2009, 3 pages.
Extended European Search Report for Application No. 09731453.8, mailed on Mar. 15, 20011 (9 pages).

(Continued)

*Primary Examiner* — Tu X Nguyen
(74) *Attorney, Agent, or Firm* — Osha Liang LLP

(57) ABSTRACT

A broadcast information notification method according to the present invention includes: starting to repeatedly transmit, at a network node, a broadcast message irrespective of transmission timing of a paging message, when the network node is instructed to notify a mobile station of the broadcast information; receiving, at the mobile station, a broadcast message reception parameter by using a parameter specified by the paging message transmitted by the network node at a predetermined timing; receiving, at the mobile station, a receivable broadcast message by using the received broadcast message reception parameter; and performing, at the mobile station, processing corresponding to the broadcast information.

7 Claims, 6 Drawing Sheets

OTHER PUBLICATIONS

Vodafone: "ETWS for GSM", TDoc GP-080142; 3GPP TSG Geran Meeting #37; Seoul, Republic of Korea; Feb. 18-22, 2008.

Ntt Docomo et al: ETWS with CBS (Alternative—CBS with IMSI Paging) SA WG2 Temporary Document; 3GPP TSG SA WG2 Meeting #62; TD S2-080837; Marina Del Rey, California, USA; Jan. 14-18, 2008.

3GPP TR 23.828 V0.1.0 (Jan. 2008); 3rd Generation Partnership Project; Technical Specification Group Services and System Aspects; Earthquake and Tsunami Warning System Requirements and Solutions (ETWS); Solution Placeholder (Release 8).

Office Action for Russian Patent Application No. 2010125709/07 dated Dec. 1, 2011, with English translation thereof (7 pages)

Commication pursuant to Article 94(3) EPC for European Application No. 09 731 453.8-1249dated Oct. 31, 2011 (5 pages).

Office Action for Australian Application No. 2009234734 dated Feb. 10, 2012 (3 pages).

Office Action for Chinese Application No. 200980101483.1 issued Feb. 24, 2012, with English translation thereof (12 pages).

* cited by examiner

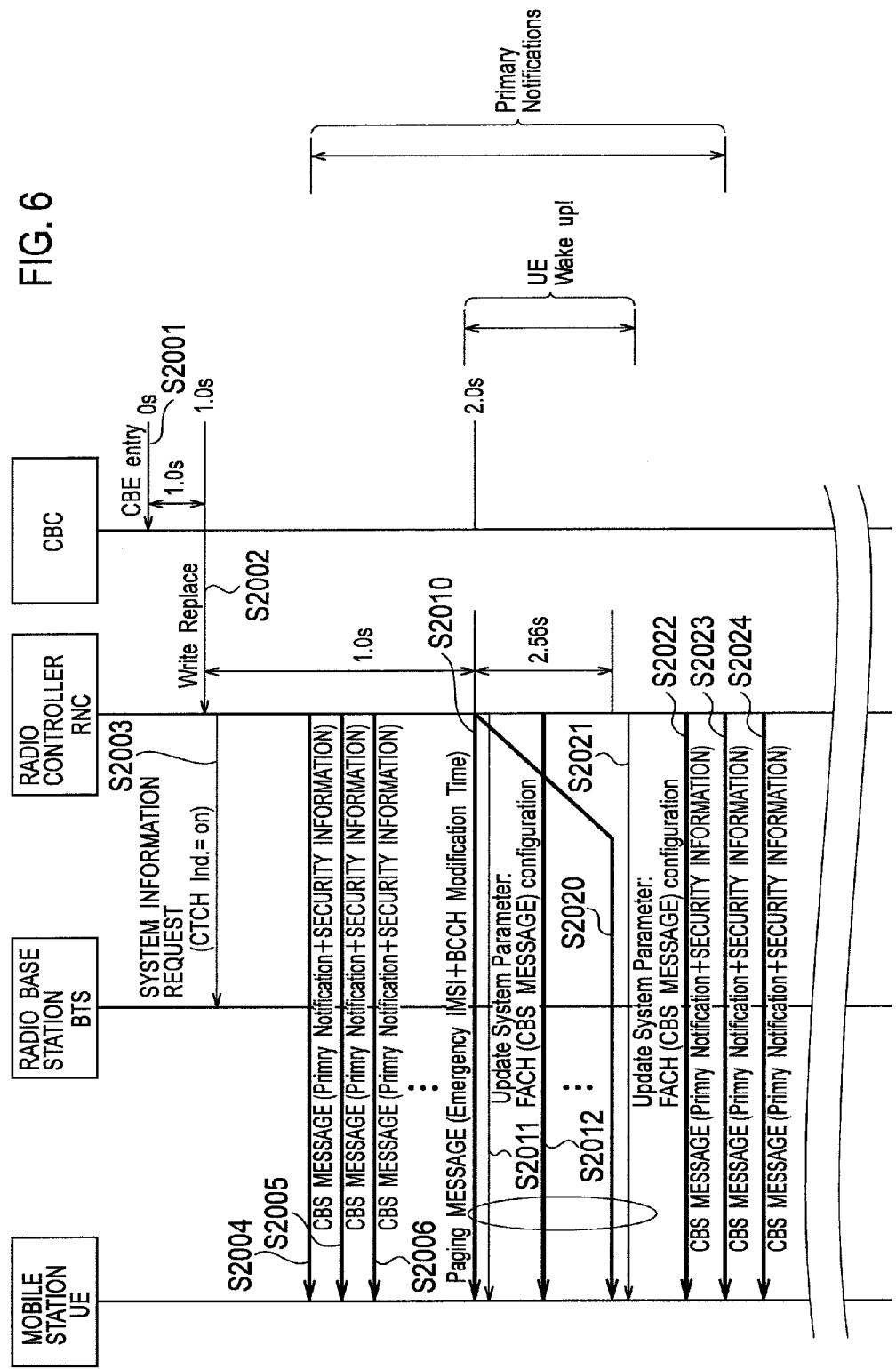

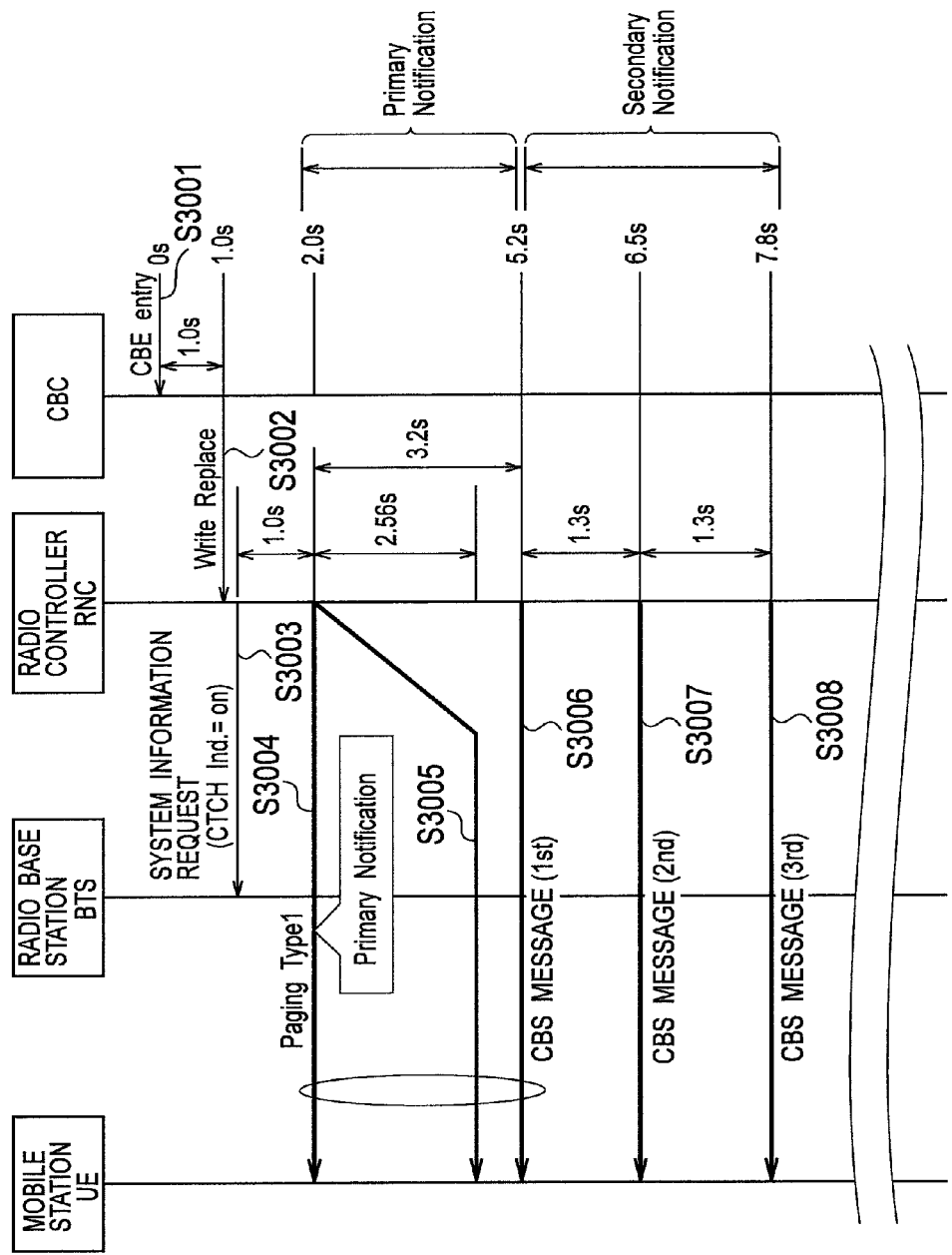

BROADCAST INFORMATION NOTIFICATION METHOD AND NETWORK NODE

TECHNICAL FIELD

The present invention relates to a broadcast information notification method and a network node which notify a mobile station of broadcast information by using a paging message and a broadcast message.

BACKGROUND ART

The 3 GPP has been discussing about the "ETWS (Earthquake and Tsunami Warning System)" for distributing emergency information (broadcast information) such as earthquake information and tsunami information.

Here, with reference to FIG. 7, description is given of operation for notifying a mobile station UE of emergency information (Primary Notification) in the "ETWS".

As shown in FIG. 7, when detecting an input from a CBE (Cell Broadcast entity) in Step S3001, a CBC (Cell Broadcast Center) transmits a Write Replace message to a radio controller RNC in Step S3002.

In Step S3003, the radio controller RNC transmits a "System Information Request" set at "CTCH Indication=0", to a radio base station BTS.

In Steps S3004 and S3005, the radio controller RNC notifies, to each mobile station UE belonging to each paging group, emergency information (Primary Notification) by using a paging message (Paging Type 1).

Thereafter, in Steps S3006 to S3008, the radio controller RNC repeatedly notifies, to the mobile station UE, detailed information (Secondary Notification) of the emergency information by using a CBS (Cell Broadcast Service) message (broadcast message).

In the above-described ETWS, the emergency information needs to be transmitted to the mobile station UE by secure communication, since a danger such as transmission of emergency information by an unauthorized radio base station BTS is conceivable.

The ETWS structure has a problem that emergency information cannot be transmitted by secure communication at the radio interface between the radio controller RNC and the mobile station UE, although being assumed to be transmitted by secure communication using a dedicated line or an IPsec at the interface between the radio controller RNC and the CBC.

Specifically, since a radio link for secure communication is not established between the radio controller RNC and the mobile station UE at the time when the emergency information is transmitted, transmission of the emergency information by secure communication is not possible at the radio interface between the radio base station BTS and the mobile station UE.

In addition, each of multiple mobile stations UE needs to judge whether or not the same paging message received by the multiple mobile stations UE is a paging message directed to the mobile station UE itself, even if a link for security communication is established between the radio controller RNC and the mobile station UE. For this reason, the network cannot provide security by using security information assigned individually to the mobile stations UE.

SUMMARY OF THE INVENTION

The present invention is made in view of the above-described problems, and is aimed to provide a broadcast information notification method and a network node which are capable of quickly transmitting emergency information to multiple mobile stations by secure communication.

A first aspect of the present invention is summarized as a broadcast information notification method for notifying a plurality of mobile stations of broadcast information by using a paging message and a broadcast message, the broadcast information notification method including the steps of: transmitting, at a network node, the paging message and a broadcast message reception parameter at predetermined timing; acquiring, at each of the plurality of mobile stations, the broadcast message reception parameter by using a parameter specified by the received paging message; acquiring, at each of the plurality of mobile stations, the broadcast message which the mobile station can receive, by using the acquired broadcast message reception parameter; and acquiring, at each of the plurality of mobile stations, security information notified by the broadcast message.

In the first aspect, the broadcast information notification method can further include the steps of: performing, at each of the plurality of mobile stations, verification on the broadcast information by using the security information; and performing, at each of the plurality of mobile stations, processing corresponding to the broadcast information, only when succeeding in the verification.

In the first aspect, the broadcast information can be notified by the paging message.

In the first aspect, the broadcast information can notified by the broadcast message.

In the first aspect, the broadcast information notification method can further include the step of: starting to repeatedly transmit, at the network node, the broadcast message irrespective of transmission timing of the paging message, when being instructed to transmit the broadcast information to the plurality of mobile stations.

A second aspect of the present invention is summarized as a network node configured to notify a mobile station of broadcast information by using a paging message and a broadcast message, the network node including: a transmitter unit configured to transmit the paging message and a broadcast message reception parameter at predetermined timing, wherein the transmitter unit is configured to make notification of the broadcast information by the paging message, and to make notification of security information to be used for verification on the broadcast information, by the broadcast message.

A third aspect of the present invention is summarized as a network node configured to notify a mobile station of broadcast information by using a paging message and a broadcast message, the network node including: a transmitter unit configured to transmit the paging message and a broadcast message reception parameter at predetermined timing, wherein the transmitter unit configured to make notification of the broadcast information and security information to be used for verification on the broadcast information, by the broadcast message.

In the second and third aspect, the transmitter unit can be configured to start to repeatedly transmit the broadcast message irrespective of transmission timing of the paging message, when the network node is instructed to notify the mobile station of the broadcast information.

A fourth aspect of the present invention is summarized as a mobile station configured to acquire broadcast information, including: a broadcast message reception parameter acquiring unit configured to acquire a broadcast message reception parameter by using a parameter specified by a received paging message; a broadcast message acquiring unit configured to acquire a receivable broadcast message by using the acquired broadcast message reception parameter; and a security information acquiring unit configured to acquire security information notified by the broadcast message.

In the fourth aspect, the mobile station can further include: a verifier unit configured to perform verification on the broadcast information by using the security information; and a processor unit configured to perform processing corresponding to the broadcast information, only when the verification is successful.

In the fourth aspect, the mobile station can further include a broadcast information acquiring unit configured to acquire the broadcast information notified by the paging message.

In the fourth aspect, the mobile station can further include a broadcast information acquiring unit configured to acquire the broadcast information notified by the broadcast message.

BRIEF DESCRIPTION OF THE DRAWINGS

FIG. 6 is a sequence diagram showing operation in a mobile communication system according to the second embodiment of the present invention.

FIG. 7 is a sequence diagram showing operation in a conventional mobile communication system.

MODES FOR CARRYING OUT THE INVENTION (Configuration of Mobile Communication System according to First Embodiment of Present Invention)

With reference to FIG. 1 to FIG. 4, description is given of a configuration of a mobile communication system according to a first embodiment of the present invention.

In the mobile communication system according to the first embodiment of the present invention, a network node is configured to notify multiple mobile stations UE of emergency information (broadcast information) by using a Paging message and a CBS message (broadcast message).

It is to be noted that, although emergency information notified in the ETWS is assumed as the broadcast information in this embodiment, different broadcast information may be used, instead.

In addition, the present invention is applicable to any type of mobile communication systems such as the LTE (Long Term Evolution) based mobile communication system, the W-CDMA (Wideband-Code division Multiple Access) based mobile communication system, the 3GPP2 based mobile communication system, the UMTS (Universal Mobile Telecommunications System) based mobile communication system and the GSM (Global System for Mobile Communications) based mobile communication system.

For example, the network node is a radio base station eNB when the present invention is used for the LTE based mobile communication system, and is a radio controller RNC when the present invention is used for the W-CDMA based mobile communication system.

In this embodiment, description is given of an example of a case in which a radio controller RNC is used as the network node in the W-CDMA mobile communication system.

Figure 1:
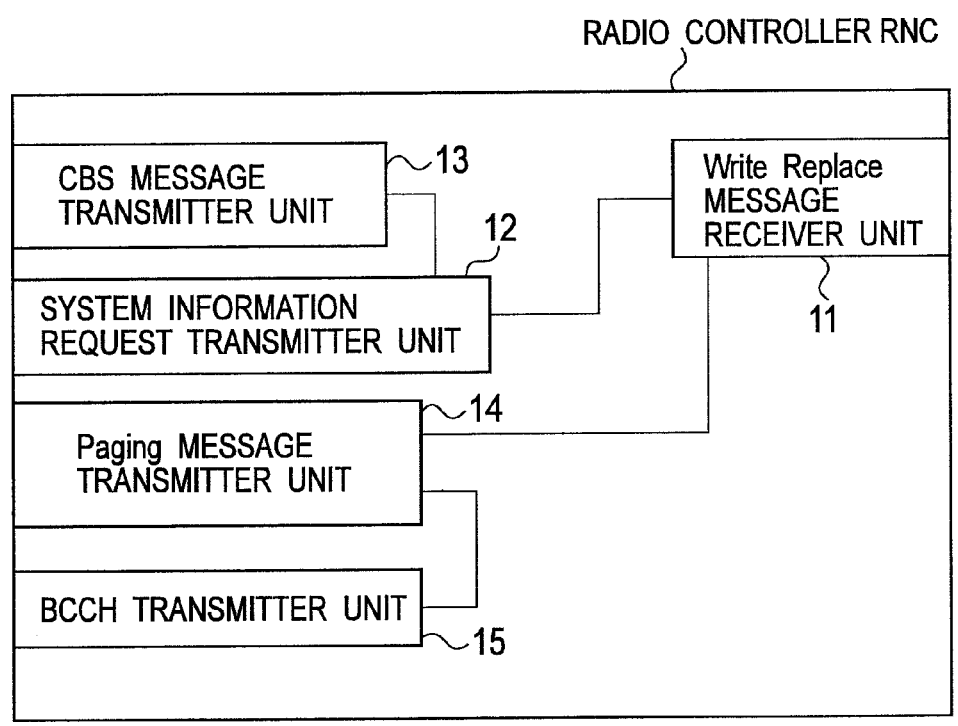
FIG. 1 is a functional block diagram of a radio controller according to a first embodiment of the present invention.

As shown in FIG. 1, a radio controller RNC (network node) according to this embodiment includes a Write Replace message receiver unit 11, a system information request transmitter unit 12, a CBS message transmitter unit 13, a Paging message transmitter unit 14 and a BCCH transmitter unit 15.

The Write Replace message receiver unit 11 is configured to receive a Write Replace message for instructing notification of emergency information to each of the mobile stations UE, from the CBC.

The system information request transmitter unit 12 is configured to enable a radio base station BTS to transmit a CBS message, by transmitting a "System Information Request" set at "CTCH Indication=0" to the radio base station BTS, when the Write Replace message receiver unit 11 receives the Write Replace message.

The CBS message transmitter unit 13 is configured to start to repeatedly transmit a CBS message, irrespective of transmission timing of a Paging message. Here, the CBS message transmitter unit 13 is configured to transmit a CBS message through a FACH (Forward Access Channel).

Moreover, the CBS message transmitter unit 13 is configured to make notification of security information to be used for verification of the emergency information (Primary notification) and detailed information (Secondary Notification) of the emergency information, by the CBS message.

Here, the security information may include a digital signature, time information (Time), location information (Location) and the like of the emergency information (Primary Notification).

The Paging message transmitter unit 14 is configured to transmit a Paging message through a PCH at predetermined timing.

Moreover, the Paging message transmitter unit 14 is configured to make notification of the emergency information (Primary Notification) by the Paging message.

The paging message includes, for example, the emergency information (Primary Notification), "Paging record IE" including "Emergency IMSI (International Mobile Subscriber Identity)", "BCCH Modification Time IE" including timing at which system information is modified in the radio base station BTS, and the like.

Here, to allow the mobile station UE to immediately acquire a "FACH configuration (broadcast message reception parameter)" transmitted through a BCCH, "BCCH Modification Time IE" is set at "0".

The BCCH transmitter unit 15 is configured to make notification of the "FACH configuration (broadcast message reception parameter)" through the BCCH (Broadcast Control Channel) at predetermined timing (specifically, timing specified by the Paging message).

Here, the "FACH configuration (broadcast message reception parameter)" is a parameter required to enable the mobile station UE to receive the CBS message.

Figure 2:
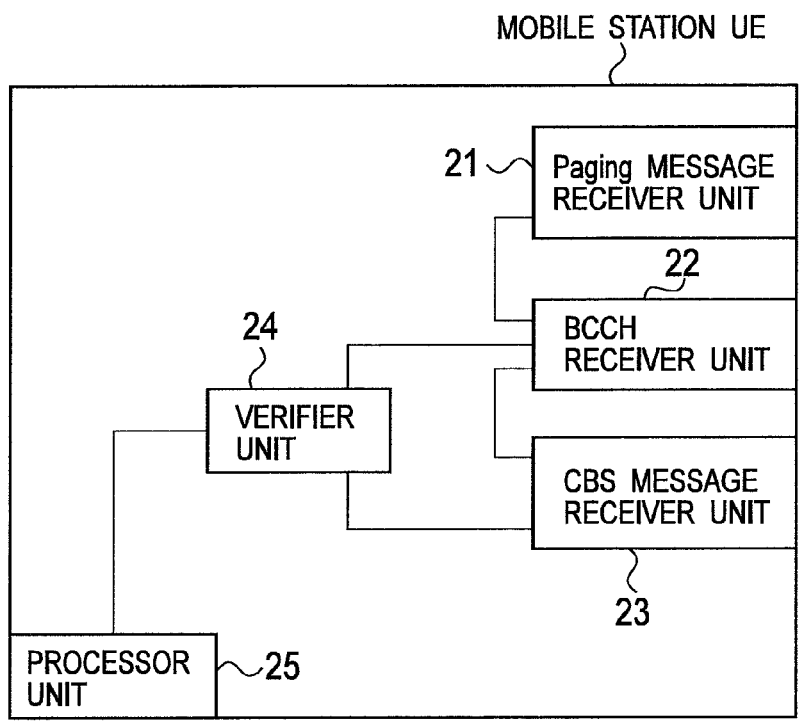
FIG. 2 is a functional block diagram of a mobile station according to the first embodiment of the present invention.

As shown in FIG. 2, the mobile station UE includes a Paging message receiver unit 21, a BCCH receiver unit 22, a CBS message receiver unit 23, a verifier unit 24 and a processor unit 25.

The paging message receiver unit 21 is configured to receive the Paging message notified by the radio controller RNC, through the PCH at predetermined timing.

The BCCH receiver 22 unit is configured to receive the "FACH configuration (broadcast message reception parameter)" through the BCCH by using parameters (timing, frequency and the like) specified by the Paging message received by the Paging message receiver unit 21.

The CBS message receiver unit 23 is configured to receive a CBS message which can be received first after the reception of the "FACH configuration (broadcast message reception parameter)", through a FACH by using the "FACH configuration (parameter for broadcast message reception)".

The verifier unit 24 is configured to perform verification on the emergency information (Primary Notification) included in the paging message received by the Paging message receiver unit 21, by using the security information included in the CBS message received by the CBS message receiver unit 23.

Figure 3:
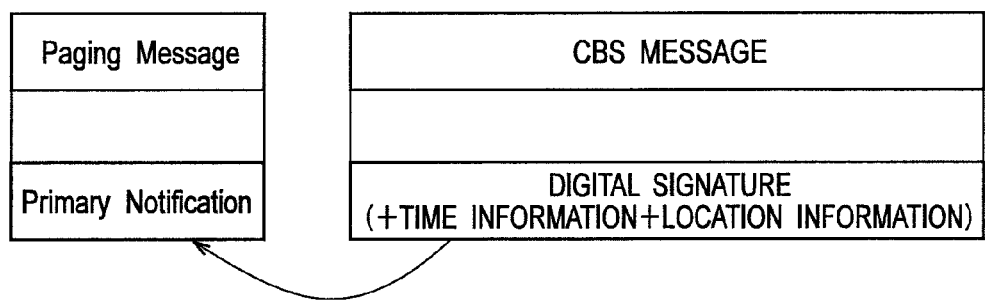
FIG. 3 is a view for describing a verification method by a verifier unit of the mobile station according to the first embodiment.

Specifically, as shown in FIG. 3, the verifier unit 24 is configured to perform verification on the emergency information (Primary Notification) included in the Paging message, by using the digital signature included in the CBS message.

The processor unit 25 is configured to perform processing (buzzer output, alarm output, display driving or the like) corresponding to the emergency information, if the verifier unit 24 succeeds in the verification.

Here, the processor unit 25 may be configured to perform processing (buzzer output, alarm output, display driving or the like) corresponding to the emergency information, without involving verification by the verifier unit 24.

(Operation in Mobile Communication System according to First Embodiment of Present Invention)

Figure 4:
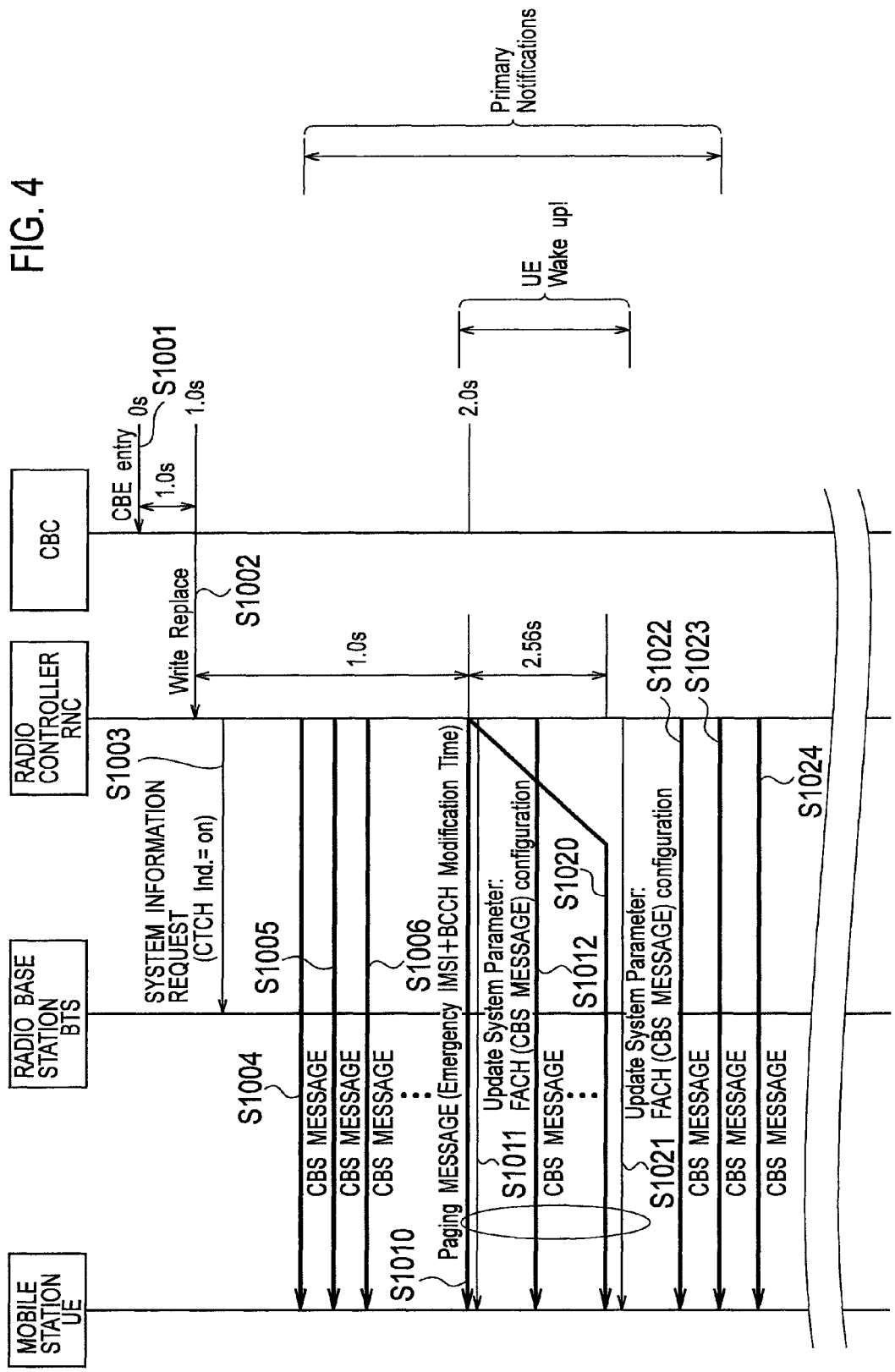
FIG. 4 is a sequence diagram showing operation in a mobile communication system according to the first embodiment of the present invention.

With reference to FIG. 4, description is given of operation in the mobile communication system according to the first embodiment of the present invention.

As shown in FIG. 4, when detecting an input from the CBE in Step S1001, the CBC transmits a Write Replace message to the radio controller RNC in Step S1002.

In Step S1003, the radio controller RNC transmits a "System Information Request" set at "CTCH Indication=0", to the radio base station BTS.

Here, when detecting that the setting of the system information is changed in the radio base station BTS to transmit a CBS, the radio controller RNC starts to repeatedly transmit a CBS message (Steps S1004, S1005, S1006, . . . , S1002, . . . , S1022, S1023 and S1024), irrespective of transmission timing of a Paging message.

In Step S1010, the radio controller RNC makes notification of emergency information (Primary Notification) by a paging message, and the mobile station UE receives the emergency information (Primary Notification) notified by the Paging message.

In Step S1011, the radio controller RNC makes notification of a "FACH configuration" through a BCCH, and the mobile station UE receives the "FACH configuration" notified through the BCCH, at timing specified by the received Paging message.

Thereafter, the mobile station UE receives a CBS message which can be received first after the reception of the "FACH configuration" (the CBS message in Step S1012, in the example of FIG. 4), through a FACH by using the received "FACH configuration".

Subsequently, the mobile station UE performs verification on the emergency information (Primary Notification) included in the Paging message received in Step S1010, by using a digital signature include in the received CBS, and then performs output corresponding to the emergency information (Primary Notification) when succeeding in the verification.

(Advantageous Effect of Mobile Communication System according to First Embodiment of Present Invention)

By using the mobile communication system according to the first embodiment of the present invention, the mobile station UE can validate emergency information (Primary Notification) included in a Paging message, by using a digital signature of the emergency information (Primary Notification) included in a CBS message which can be received by the multiple mobile stations. Accordingly the mobile communication system can enable notification of emergency information by secure communication.

Moreover, in the mobile communication system according to the first embodiment of the present invention, the radio controller RNC starts to repeatedly transmit a CBS message before a Paging message. Accordingly, the mobile station UE can receive a CBS message which can be received first after reception of a "FACH configuration", by using the received "FACH configuration". In this way, the mobile communication system can enable quick notification of emergency information, specifically, satisfy a requirement of the "ETWS", i.e., within four seconds.

(Mobile Communication System according to Second Embodiment of Present Invention)

Figure 5:
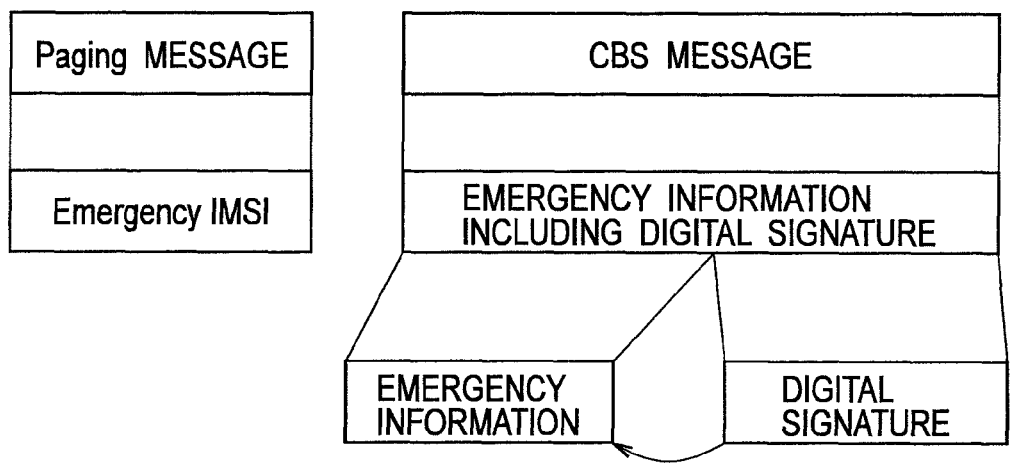
FIG. 5 is a view for describing a verification method by a verifier unit of a mobile station according to a second embodiment of the present invention.

With reference to FIG. 5 and FIG. 6, description is given of a mobile communication system according to a second embodiment of the present invention. In the following, the mobile communication system according to the second embodiment of the present invention is described by focusing on differences compared with the mobile communication system according to the above-described first embodiment.

In this embodiment, a CBS message transmitter unit 13 of a radio controller RNC is configured to make notification of the emergency information (Primary Notification) and Security Information to be used for verification on the emergency information, by a CBS message.

Moreover, a verifier unit 24 of the mobile station UE is configured to perform verification on the emergency information (Primary Notification) included in the CBS message received by a CBS message receiver unit 23, by using the Security Information included in the CBS message.

Specifically, as shown in FIG. 5, the verifier unit 24 is configured to perform verification on the emergency information (Primary Notification) included in the CBS message, by using a digital signature included in the CBS message.

By FIG. 6, description is given of operation for notifying the mobile station UE of emergency information (Primary Notification) in the mobile communication system according to this embodiment.

This operation is the same as the operation shown in FIG. 4 except for the following respects: the mobile station UE is notified of the emergency information (Primary Notification) by a CBS message in Step S2012, instead of being notified of the emergency information (Primary Notification) by a Paging message in Step S2010; and the mobile station UE performs verification on the emergency information (Primary Notification) included in the CBS message, by using a digital signature included in the received CBS message.

Note that the above-described operation by each of the mobile station UE, the radio base station BTS (eNB), an exchange MME and the radio controller RNC may be implemented by hardware, software modules executed by a processor, or a combination of both.

Each software module may be included in any type of storage medium such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk or a CD-ROM.

The storage medium is connected to a processor so that the processor can read and write information from or to the storage medium. Alternatively, the storage medium may be integrated into the processor. Alternatively, the storage medium and the processor may be provided in an ASIC. The ASIC may be provided in the mobile station UE, the radio base station BTS (eNB), the exchange MME or the radio controller RNC. Alternatively, the storage medium and the processor may be provided as discrete components in the mobile station UE, the radio base station BTS (eNB), the exchange MME or the radio controller RNC.

Hereinabove, the present invention is described in detail by using the above-described embodiments. However, it is apparent to those skilled in the art that the present invention is not limited to the embodiments described in this description. The present invention can be implemented as a modified or changed mode without departing from the spirit or scope of the present invention defined by what is described in the scope of claims. Accordingly, what is described in this description is intended to provide illustration, and is not intended to impose any limitation on the present invention.

INDUSTRIAL APPLICABILITY

As described above, the present invention can provide a broadcast information notification method and a network node which are capable of quickly transmitting broadcast information to multiple mobile stations by secure communication.

The invention claimed is:

1. A broadcast information notification method for notifying a plurality of mobile stations of broadcast information by using a paging message and a broadcast message, the broadcast information notification method comprising the steps of:
   transmitting, at a network node, the paging message and a broadcast message reception parameter at predetermined timing;
   acquiring, at each of the plurality of mobile stations, the broadcast message reception parameter by using a parameter specified by the received paging message;
   acquiring, at each of the plurality of mobile stations, the broadcast message which the mobile station can receive, by using the acquired broadcast message reception parameter;
   acquiring, at each of the plurality of mobile stations, security information notified by the broadcast message,
   performing, at each of the plurality of mobile stations, verification on the broadcast information by using the security information; and
   performing, at each of the plurality of mobile stations, processing corresponding to the broadcast information, only when succeeding in the verification.

2. The broadcast information notification method according to claim 1, wherein the broadcast information is notified by the paging message.

3. The broadcast information notification method according to claim 1, wherein the broadcast information is notified by the broadcast message.

4. The broadcast information notification method according to claim 1, comprising the step of:
   starting to repeatedly transmit, at the network node, the broadcast message irrespective of transmission timing of the paging message, when being instructed to transmit the broadcast information to the plurality of mobile stations.

5. A mobile station configured to acquire broadcast information, comprising:
   a broadcast message reception parameter acquiring unit configured to acquire a broadcast message reception parameter by using a parameter specified by a received paging message;
   a broadcast message acquiring unit configured to acquire a receivable broadcast message by using the acquired broadcast message reception parameter;
   a security information acquiring unit configured to acquire security information notified by the broadcast message,
   a verifier unit configured to perform verification on the broadcast information by using the security information; and
   a processor unit configured to perform processing corresponding to the broadcast information, only when the verification is successful.

6. The mobile station according to claim 5, comprising a broadcast information acquiring unit configured to acquire the broadcast information notified by the paging message.

7. The mobile station according to claim 5, comprising a broadcast information acquiring unit configured to acquire the broadcast information notified by the broadcast message.

* * * * *